United States Patent [19]

Julian et al.

[11] Patent Number: 4,859,430
[45] Date of Patent: Aug. 22, 1989

[54] AIR DISTRIBUTION DEVICE

[75] Inventors: Scott C. Julian, Chicago; Ismail B. Cetinkaya, Palatine, both of Ill.

[73] Assignee: UOP, Des Plaines, Ill.

[21] Appl. No.: 67,659

[22] Filed: Jun. 29, 1987

[51] Int. Cl.$^4$ .............................................. F27B 15/10
[52] U.S. Cl. .................................... 422/310; 34/57 A; 239/557; 422/144; 422/223
[58] Field of Search ............... 422/143, 223, 310, 139, 422/144; 239/567, 557, 558, 559, 600; 34/57 A

[56] References Cited

U.S. PATENT DOCUMENTS 3,912,460 10/1975 McGann .......................... 239/559 X
4,478,707 10/1984 Bischoff et al. ...................... 422/143

Primary Examiner—Barry S. Richman
Assistant Examiner—Amalia L. Santiago
Attorney, Agent, or Firm—Thomas K. McBride; John G. Tolomei

[57] ABSTRACT

An improved air distribution device for distributing fluidizing gas to a bed of fluidized solids. The distribution device is arranged to maintain a bed of fluidized particles above a planar region of air injection and allow withdrawal of solids from below the region of air injection. The fluidizing gas is distributed to a bed of fluidized particles by a central dome and a series of horizontally extending branch pipes arranged about the periphery of the dome. In order to improve the structural integrity of the apparatus and the operation of the device, the horizontal branch pipes are attached to a knuckle region of the central dome by a series of extruded outlets that minimize stress concentrations in the branch pipe connection and locate outlet holes in the branch pipes at an elevation close to the outlet holes in the dome.

5 Claims, 3 Drawing Sheets

AIR DISTRIBUTION DEVICE

FIELD OF THE INVENTION

This invention pertains to gas distribution devices for hydrocarbon processes. More specifically, this invention relates to a device for uniformly distributing gas over a bed of fluidized solids.

BACKGROUND OF THE INVENTION

Processes employing beds of fluidized solids in modes of fluidized suspension or fluidized transport are well known. A particularly well known example of such a process is the fluidized catalytic cracking (FCC) process for the conversion of gas oils and heavier boiling hydrocarbons into lighter hydrocarbons. In most applications where a large diameter vessel or conduit confines the fluidized particles, it is essential that a good distribution of the gaseous fluidizing medium be obtained over the entire cross-section of the vessel or conduit. Good distribution of gas is necessary to evenly convey the particles when the fluidized bed is in a transport mode. Moreover, the introduction of a gas reactant, typically air, into the bed of fluidized particles increases the demand for even air distribution. A poor distribution of air promotes variations in the reaction rates over different portions of the confinement vessel which can lead to incomplete reactions and a non-uniform temperature profile. This is particularly true when operating a dense fluidized bed.

FCC units typically include a regenerator, many of which maintain a dense fluidized bed of catalyst particles through which a regeneration gas, such as air, passes to combust coke. The coke forms as a by-product of the cracking operation, and its removal regenerates the catalyst. A common regenerator arrangement introduces a regeneration gas, or air, into the bottom of the regenerator through the bottom closure of the regenerator vessel. The air distribution device divides the air and injects it into the catalyst bed at a multiplicity of points in order to obtain good air distribution. As long as there is no need to withdraw catalyst particles from below the point of air introduction, a simple air distribution device such as a perforated plate or dome over an air chamber will provide efficient and reliable air distribution for the regenerator.

However, the configuration of some FCC process flow arrangements require the removal of catalyst through the bottom closure of the regenerator. The need to withdraw catalyst from the bottom closure of the regenerator complicates the design of the air distribution device. The design of a reliable air distribution device is further complicated by regenerator operating temperatures that normally exceed 705° C. (1300° F.). These temperatures greatly reduce the strength of the materials from which the air distribution devices can be fabricated.

A variety of distribution device designs have been used that will permit the introduction of air and the withdrawal of catalyst from the bottom of the regenerator. One design was the modification of a full plate or dome type air distribution device to include a conduit that extended through the air distribution chamber and communicated a catalyst withdrawal point on the bottom closure with a collection point above the top dome or plate. In this arrangement, the conduit pierced the dome or plate. In order to prevent air leakage around and catalyst movement through the opening for the conduit, a seal bridged the opening between the outer conduit wall and the plate or dome. Catalyst induced erosion and the accumulation of fine catalyst particles made this seal prone to failure. Providing the catalyst collection area above the grid also blocked a significant portion of the distributor cross-section thereby interfering with air distribution.

In order to avoid the problems associated with the seal and to allow free passage of solid particles to a withdrawal point located below the point of air distribution, distribution devices consisting of a planar network or grid of horizontal pipe sections with air outlet nozzles spaced along the pipes have been used. Structural difficulties are often encountered with these pipe type grids. Such problems include weld cracking, metal erosion and warping of pipe sections, as well as the complete detachment or loss of pipe components. Although attempts were made to strengthen the pipe type grid, failure of stronger pipe components still occurred. The inability of stronger pipe components to remedy the problems is believed to stem from the fact that stresses which cause pipe warpage and cracking are typically generated by temperature differentials over the pipe components. Thus, strengthening the grid only serves to intensify the stresses and exacerbate the problems.

Cognizant of the fact that at least some of the stresses leading to failure of air grid components are thermally induced, more flexible designs for air distribution devices have been sought. One such design uses a combination of a dome and radially extending pipe branches to distribute air over the entire regeneration cross-section. This design provides flexibility by using, as a dome, a shallow dish head having a diameter smaller than the diameter of the regenerator vessel. The dome is often supported by a frusto-conical reducer section which decreases the diameter of the dome down to a smaller diameter section which is attached to the bottom of the regenerator closure. A relatively thin wall section and gradual taper of the frusto-conical section provide flexibility to allow for differential thermal expansions in the dome and reducer sections which are induced by temperature gradients and varying expansion rates. The reducer section allows an open space to be maintained between the outside diameter of the frusto-conical section and the end closure of regenerator so that fluidized particles can flow around the dome and into a catalyst withdrawal point. An evenly spaced series of orifices or nozzles distributed over the top of the dome distribute air uniformly over the cross-section of the regenerator lying above the dome.

The remaining cross-section of the regenerator, which is not above the dome, receives a uniformly distributed flow of air through the radially extending pipe branches. Orifices or nozzles are spaced along the branch pipes to provide outlets for the air. The pipe branches project from a cylindrical band which extends vertically and is located between the dome and frusto-conical section. Geometric discontinuities such as sharp corners or junctions between connecting components will multiply the magnitude of thermally or pressure induced stresses. In order to avoid such discontinuities between the vertical band, dome or reducer section, a large radius transition section or knuckle is provided at such junctions. Although the dome and branch pipe style air distribution device did alleviate some of the structural problems generally associated with the air distributors, small cracks in the junction between the band and the dome, and the band and the branch arms persisted in some cases. In addition, erosion of the dome and pipe arm material continued to be a problem. One source of the erosion appeared to be the result of a differential pressure between the outlets on the top of the dome and the outlets on the branch arms which aspirated catalyst into the interior of the dome through the branch arm openings and out through the holes on the dome.

A new attachment arrangement has been discovered for connecting the pipe branches in a dome and pipe branch type air distribution device. This new connection alleviates the cracking problems sometimes associated with the band to dome and band to branch pipe junction while also raising the elevation of the pipe arm outlets relative to the dome outlets so that the beforementioned aspiration of solid particles will not occur.

SUMMARY OF THE INVENTION

This invention is an improvement to a gas distribution device wherein the gas distribution device comprises a central dome and a series of radially projecting pipe branches for uniformly distributing gas over the cross-section of fluidized bed of particles while allowing particles to flow below the point of gas distribution. The improvement is the use of extruded connections that have an outwardly and upwardly extending segment to attach the pipe branches to a knuckle section located between the dome and its supporting member. Placing the extruded connection or extrusion in the knuckle section of the distribution device raises the elevation of the pipe branches with respect to the dome. The outlet of the extrusion will have a center line projecting at some upward angle with respect to the horizontal plane of the outlet openings. The use of a pipe elbow or bend to bring the center line projection of the outlet back to a horizontal orientation will further increase the relative height of the pipe branches with respect to the elevation of the dome outlet. The extruded outlet of the knuckle also provides a smooth geometric transition from the knuckle to pipe branch connections and alleviates stress risers that have contributed to the cracking problems of past air distributor designs. At the same time, the pipe branch connection of this invention relieves erosion problems by locating the outlets of the dome and pipe branches at a closer elevation.

Accordingly, it is an object of this invention to provide a reliable device for evenly distributing gas over a bed of solid particles.

It is a further object of this invention to improve the structural integrity of an air distribution device for distributing air in an FCC regenerator.

It is a more specific object of this invention to reduce cracking and erosion problems associated with a dome and pipe branch type air distribution device used in an FCC regenerator.

In one embodiment, this invention comprises an improved gas distribution device for distributing gas over a bed of fluidized solid particles. The gas distributor consists of a perforated central head having a predetermined arrangement of air distribution holes extending therethrough, and means for both supporting the head and conveying a fluidizing gas through an interior portion of the head. The means for supporting the head includes a toroidal knuckle attached to the outer periphery of the head. A series of radially and horizontally extending pipe branches are connected to the means for supporting the head and communicate with the interior of the head. The pipe branches also distribute fluidizing gas to the bed of solid particles. The gas distributor design is improved by the knuckle having a series of pipe branch connections formed therein. Each pipe branch connection has an outlet that communicates with the interior of the head and through which a pipe branch is attached to the connection. In order to improve the structural integrity of the device, the geometry of each pipe branch connection consists of continuous curves.

Other objects, embodiments, and details of this invention will be apparent from the following detailed description of the preferred embodiment. The description of this invention in the context of a preferred embodiment is not intended to restrict the scope of the claims to the details disclosed therein.

DETAILED DESCRIPTION OF THE PREFERRED EMBODIMENT

Figure 1:
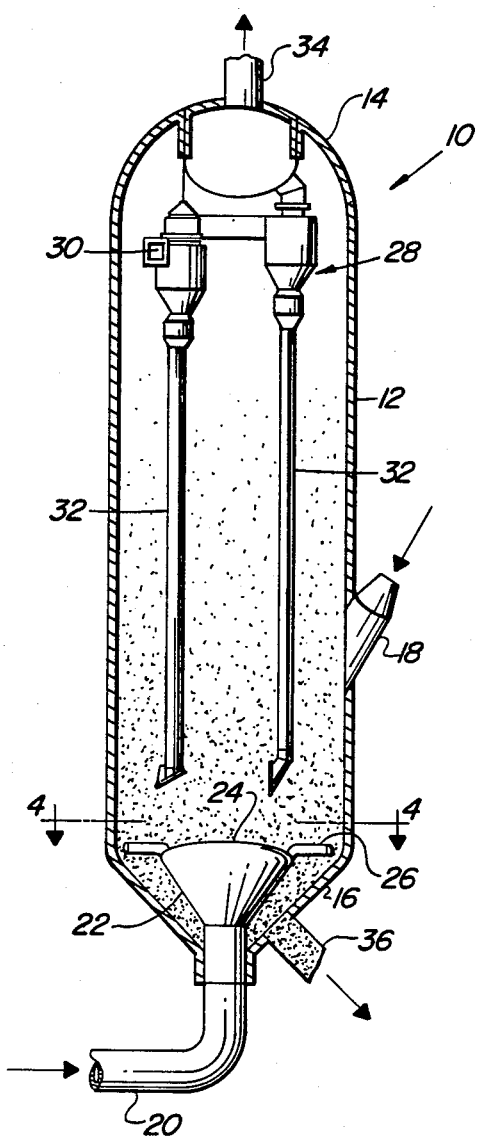
FIG. 1 illustrates a cross-section of an FCC regenerator.

Looking then at FIG. 1, there is shown a regenerator 10 having a cylindrical shell 12, a top head 14, and a bottom closure 16 in the form of a conical section. Solid particles comprising spent catalyst enter regenerator 10 through a conduit 18. Compressed fluidizing gas comprising air flows through a conduit 20 and into the interior of a pipe branch type air distribution device 22. A dome 24 in the top of the air distribution device and a series of radially projecting pipe branches 26 distribute the air over the entire horizontal cross-section of the regenerator. The air rises upward and reacts with carbonaceous deposits on the catalyst, such as coke. The combustion of the carbon deposits with oxygen will produce temperatures at least above 650° C. (1200° F.) and more typically above 705° C. (1300° F.) so that the combustion produces a region of intense heat directly above the dome and pipe branches. Upward movement of the air fluidizes the catalyst above the dome and pipe branches. Air is introduced in a volume that will maintain a fluidized bed up to about confluence of conduit 18 with shell 12. As the air continues to rise, catalyst particles disengage, for the most part, and return to the dense bed of catalyst. Any catalyst that remains entrained with the air and gaseous combustion products referred to as flue gas enter a set of cyclone separators 28 through an inlet 30. Cyclone separators 28 centrifugally disengage the heavier catalyst particles from the lighter gases in two stages of separation. While the separators direct the catalyst particles downward through conduits 32 and back to the dense bed, the regeneration gases leave the regenerator through conduit 34. The regenerated catalyst particles, (i.e., those having a reduced concentration of coke as compared to the particles entering through conduit 18), pass through spaces between branch pipe 26 and are withdrawn from the regenerator vessel through regenerated catalyst conduit 36.

Figure 2:
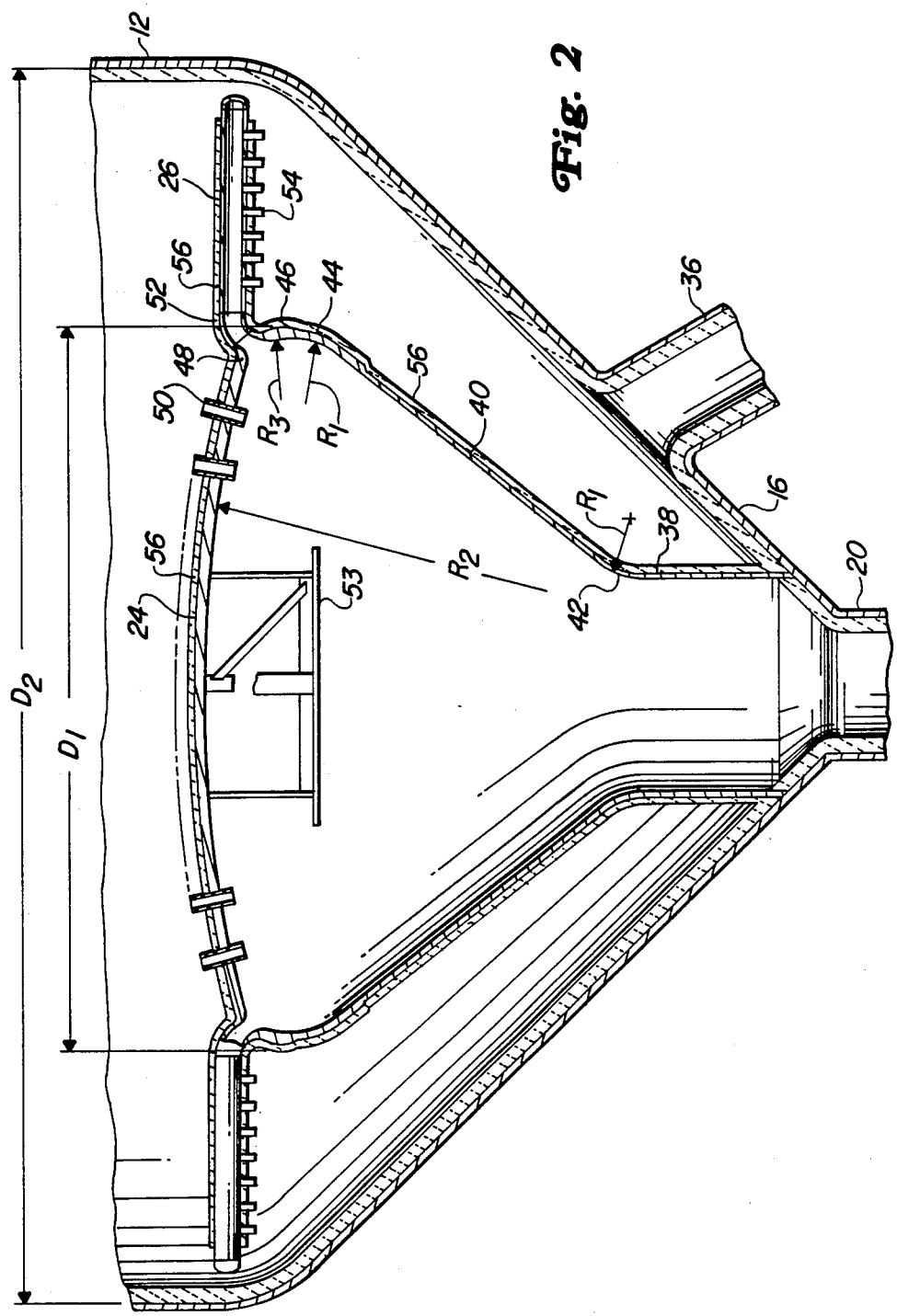
FIG. 2 depicts a vertical section of the air distribution device of this invention.

Further detail of the air distribution device appears in FIG. 2. The bottom of the air distribution device is a lower conduit 38 which is attached to bottom closure 16. A frusto-conical section 40 has a small end attached to the top conduit 38. A toroidal knuckle 42 connects the lower end of section 40 with the conduit 38 and another toroidal knuckle 44 connects the top of section 40 with knuckle 46 of dome 24. Toroidal knuckles 42 and 44 provide a smooth transition for the junctions of the conduit and dome with section 40. Knuckles 42 and 44 are provided with a bend radius, $R_1$, of from 5 to 15% of its major toroidal diameter. The tangent lines of the knuckle or small radius section coincide with the tangent lines of the elements to which it is attached. Lower conduit 38, knuckle 42, and frusto-conical section 40 have a relatively thin wall section. Upper knuckle 44 has an increased thickness in order to provide a gradual thickness transition between the cone portion and the much thicker dome 24 and knuckle 46.

The dome 24 and knuckle 46 together provide a dished head design for the top of the air distribution device. This type of head is commonly known as a flanged and dished head. The shallow geometry for the head is chosen to minimize the difference in elevation between holes in the center of the dome and holes towards the outer edge of the dome. When the dome of the distributor has a small diameter, a flat plate section may sometimes be used for the center portion of the dome. However, when air flow through the air distribution device is stopped catalyst within the regenerator will accumulate on the top of the dome and impose a downward catalyst loading. Therefore, it is usually preferred that the dome have some arcuate shape in order to increase the strength under the downward catalyst loading. The diameter $D_1$ of the dome will usually equal 40–70% of the diameter $D_2$ of the regenerator vessel. The radius of curvature for the head $R_2$ is preferably between 100 and 200% of the diameter of the dome. Curvature $R_3$ of knuckle 46 will usually range from 5–25% of the head diameter $D_1$. Dome 24 and its knuckle 46 are made substantially thicker than cone section 40. The additional thickness of the dome is provided so that the dome can support external loads, such as catalyst loading, and will contain adequate extra material to reinforce the dome around the air distribution apertures.

A predetermined pattern of air outlet openings 50 is arranged over the dome portion of the air distributor device. The distributor openings have a radial orientation along the line of radius $R_2$. The size of these holes typically ranges from $\frac{1}{2}''$ to $1\frac{3}{4}''$. The openings may be simply drilled holes in the top dome or may be defined by nozzles fitted into holes within the top dome area. The nozzles serve a variety of purposes such as improving the jet characteristics of the air leaving through the nozzles and protecting the outlet opening from erosion caused by the circulation of catalyst near the outlet opening. Fluidizing gas and pressure drop requirements determine the total open area of the holes that will be required at the top of the
dome. It is usually desirable to maintain between $\frac{1}{2}$ to 2 psi pressure drop across the dome. The diameter of the dome openings is chosen so that the dome has the required open hole area with a sufficient number of air openings to provide good distribution.

A perforated deflector plate 53 is suspended from the inside of the dome and serves to break up any large jet of fluid that may be formed by air entering through conduit 20. If uninterrupted, an air jet from conduit 20 can increase the gas pressure at the inlet of any of openings 50 located immediately above the jet thereby causing a higher air flow at the center of the grid.

Knuckle portion 46 may be formed separately and welded to the dome to form the distributor head or may be integrally formed with the head. In either case the major purpose of this knuckle is again to provide a smooth junction between the dome support member, in this case frusto-conical section 40 and the dome. In accordance with this invention, the knuckle 46 contains a series of regularly spaced pipe branch connections 48 having outlets for the attachment of the pipe branches 26. In a preferred embodiment, these connections are extruded from the material of the knuckle. The knuckle is usually made the same thickness as the dome section of the distributor. This thickness aids in the formation of extrusions 48 by providing extra material for the extrusion forming process. The extrusion can be formed by any method known to those skilled in the art of metal forming. The basic requirement for the extrusion is that knuckle and outlet be connected by material having a geometry consisting of continuous curves. A typical method of forming such extrusions uses male and female dies to progressively deform material around a drilled hole into the shape of the outlet nozzle extrusion. The branch connection opening is usually centered over the curvature of the knuckles so that the centerline of the outlet formed therein has an upward slope or upward angle. The inlet side of the extrusion nozzle communicates with the interior portion of the air distribution device. The outlet end of the extrusion supports an arcuate pipe branch section or elbow 52.

Figure 3:
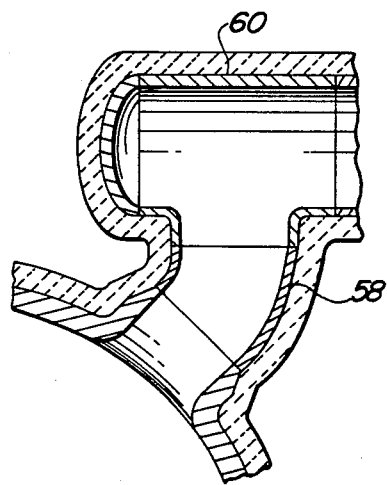
FIG. 3 is an alternate detail for the air distribution device of this invention.

Arcuate pipe section 52 connects the upward sloping extrusion to the horizontally extending pipe branch 26. The pipe section 52 is shown in this case as a simple pipe elbow, however, a variety of pipe components can be used to provide the function of section 52. The process requirement for such components is that they provide pipe branches 26 with a sufficient horizontal elevation to allow branch pipe openings 54 to be located at an elevation close to the elevation of the dome openings. Thus, suitable elements for section 52 include lateral branch connections or a combination of an elbow and a T-section as shown in FIG. 3. The elbow 58 and the T-section 60 of FIG. 3 have the added advantage of facilitating adjustment of the branch arm elevation relative to the dome.

Each pipe branch extends horizontally to approximately the interior wall of the regenerator vessel. Air, communicated to the interior of the pipe branches enters the regenerator through openings 54 which are spaced along the bottom of the pipe branches. The openings 54 in the branch pipe have sizes generally ranging from $\frac{1}{2}''$ to $1''$. The openings 54 for the pipe branches use nozzles as shown in FIG. 2 and previously discussed in connection with the dome openings. The number and size of openings 54 are calculated to provide the desired volume of air addition through the branch pipes. The division of air addition between the branch pipes and the central dome is usually in ratio to the cross sectional area served by the branch pipes and the dome.

Figure 4:
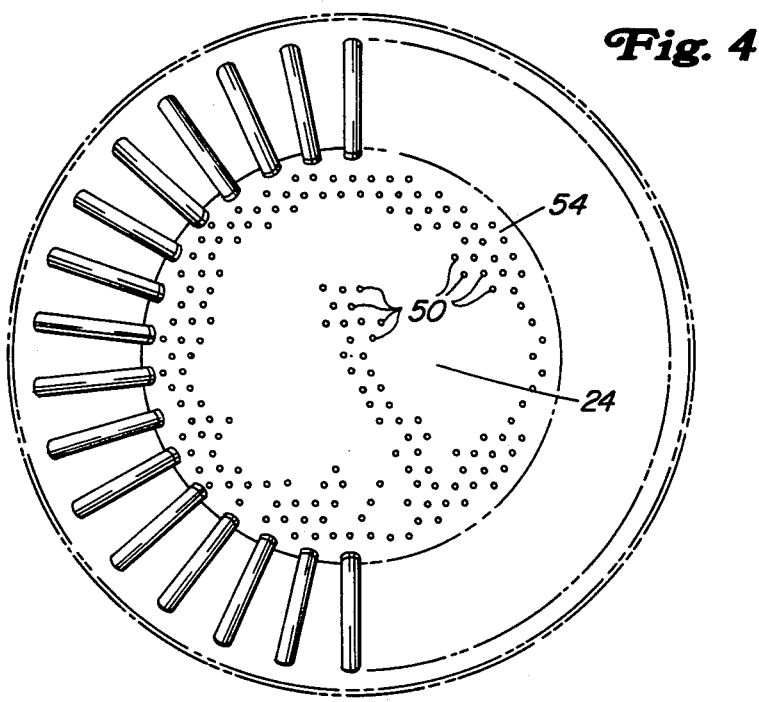
FIG. 4 is a partial plan view of the regenerator taken at Section 4—4 of FIG. 1.

Turning then to FIG. 4, the dome and arms are shown in plan over the cross section of the regenerator.

Dome openings 50 are evenly spaced from the center of dome 24 outward to approximately the upper junction of the knuckle. It is preferable to avoid having the openings 50 extend into the knuckles region of the dome in order to avoid weakening the weld at the dome to knuckle junction when such a weld is provided. In this particular arrangement the dome has a diameter equal to approximately half the diameter of the regenerator. Therefore, the area of the bed receiving fluidizing gas from the pipe branches is much greater than the area of the bed fluidized by the dome. It is, therefore, desirable to use a large number of arms circling the dome in order to provide good distribution of air over the outer diameter of the regenerator. Forming requirements that demand a minimum clearance between the extrusions limit the circumferential spacing of the pipe branches around the dome's periphery. Typically, the minimum spacing between branch pipe centerlines is twice the branch pipe diameter, with slightly larger spacings being preferred.

Figure 5:
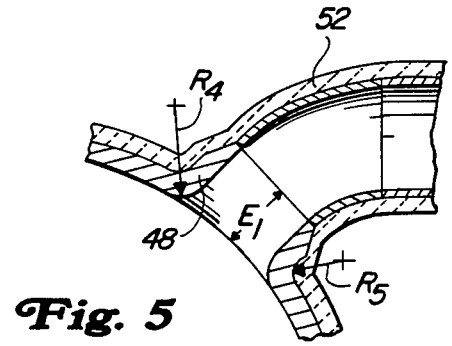
FIG. 5 is an enlarged detail of the extruded connection for the pipe branch.

Additional details of the extruded connection, as set forth in FIG. 5, shows a radius $R_4$ on the inside of the extrusions and a radius $R_5$ on the outside extrusions. These radii are determined by the extrusion forming process and are preferably kept as large as possible. FIG. 5 also shows pipe elbow 52 welded to the outlet of the branch connection 48. Usually pipe elbow 52 will be a separate component since the forming of the extrusion will normally only provide a small outward extension, $E_1$, of the branch connection. However, wherever possible, it would be desirable to form the extrusion and branch section 52 in one piece.

Due to the high temperatures associated with the FCC process the air distribution device is typically formed of high alloy materials. Suitable high alloy materials for the air distribution device include stainless steels, type 304H, as defined by ASTM standards, being the preferred metallurgy.

FIG. 2 shows a refractory material 56 covering almost the entire air distribution device. This refractory material is relatively thin usually having a thickness of from ½" to 1½. The refractory material 56 provides erosion protection and a degree of insulation for the metal of the air distribution device and thereby evens out localized temperature gradients that could impose thermal stresses on the grid. Use of thin refractories and appropriate anchoring systems are well known in the hydrocarbon and chemical processing fields. Preferably, the refractory material is held to the air distribution device by a metal mesh or short anchors welded to the base metal of the device.

What is claimed is:

1. In a gas distribution device for distributing gas over a fluidized bed of solid particles, the distributor being of a type having: a perforated central head for distributing gas over a central portion of said fluidized bed, a plurality of radially and horizontally extending perforated pipe branches for distributing gas over an annular region of said fluidized bed; and means for supporting said head and pipe branches and conveying said fluidizing gas to the interior portion of said head and pipe branches, said means for supporting said head comprising a toroidal knuckle for supporting said head, and being located between said head and said pipe branches, said toroidal knuckle surrounding the periphery of said head, the improvement comprising said toroidal knuckle having a plurality of pipe branch connections formed therein and regularly spaced about the major circumference of said toroidal knuckle, each of said pipe branch connections having an outlet in communication with the interior of said central head, each branch connection having a geometry consisting of continuous curves and said pipe branches being attached to said knuckle through at least pipe elbows connected to said pipe branch connections.

2. The device of claim 1 wherein each of said outlets has a centerline axis that projects radially outward from said central head and extends above a horizontal plane that passes through said outlet.

3. The device of claim 1 wherein said outlets have the same diameter as said pipe branches.

4. The device of claim 1 wherein a proximate end of a pipe elbow is fixed to said outlet, the distal end of said elbow is oriented upward, a pipe tee having a horizontal oriented major axis is attached to said distal end such that one end of said tee is outwardly directed with respect to said central head, and a pipe branch is attached to said outwardly directed end of said pipe tee.

5. The device of claim 1 where a minimum spacing equal to at least one pipe branch diameter is provided between the outlets of said pipe branch connections.

* * * * *